(12) United States Patent
Sun

(10) Patent No.: US 8,164,894 B2
(45) Date of Patent: Apr. 24, 2012

(54) HARDWARE HOLDING DEVICE FOR COMPUTER

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 183 days.

(21) Appl. No.: 12/788,290

(22) Filed: May 26, 2010

(65) Prior Publication Data

US 2011/0096492 A1 Apr. 28, 2011

(30) Foreign Application Priority Data

Oct. 27, 2009 (CN) .......................... 2009 1 0308907

(51) Int. Cl.
*H05K 7/00* (2006.01)
*A47B 81/00* (2006.01)
*H01R 13/62* (2006.01)

(52) U.S. Cl. ......... 361/679.33; 361/679.34; 361/679.35; 361/679.36; 361/679.37; 361/679.38; 312/223.2; 439/157; 439/160

(58) Field of Classification Search .. 361/679.31–679.4, 361/679.55–679.6, 724–727; 312/223.1, 312/223.2; 439/60, 151–160, 327, 328, 331, 439/638
See application file for complete search history.

(56) References Cited

U.S. PATENT DOCUMENTS

| | | | |
|---|---|---|---|
| 2006/0002078 A1* | 1/2006 | Jing | 361/685 |
| 2010/0165564 A1* | 7/2010 | Lu | 361/679.35 |

* cited by examiner

*Primary Examiner* — Robert J Hoffberg
*Assistant Examiner* — Jerry Wu
(74) *Attorney, Agent, or Firm* — Altis Law Group, Inc.

(57) ABSTRACT

A hardware holding device includes a chassis, a bracket, a fastening structure and a hardware component. The bracket is fixed in the chassis. The fastening structure includes two levers each having a latch perpendicularly extending from one end of the corresponding lever, and two elastic members correspondingly arranged on the levers. The levers are rotatably mounted on the surface of the bracket. The elastic members are resiliently compressed between the surface of the bracket and the levers to keep the latches of the levers extended through the bracket and inside of the bracket thereby clasping and fixing a hardware component in the bracket.

7 Claims, 6 Drawing Sheets

HARDWARE HOLDING DEVICE FOR COMPUTER

BACKGROUND

1. Technical Field

The disclosure relates to computers and, particularly to a hardware holding device in a computer.

2. Description of Related Art

The hardware of a computer, such as a hard disk or a CD-ROM, is traditionally fixed in a chassis of the computer with dedicated fasteners. However, dedicated tools are needed to release the fasteners to disassemble the hardware from the chassis, which can be very inconvenient for users.

Therefore it is desirable to provide a hardware holding device for a computer which can be detached easily without tools.

DETAILED DESCRIPTION

Figure 1:
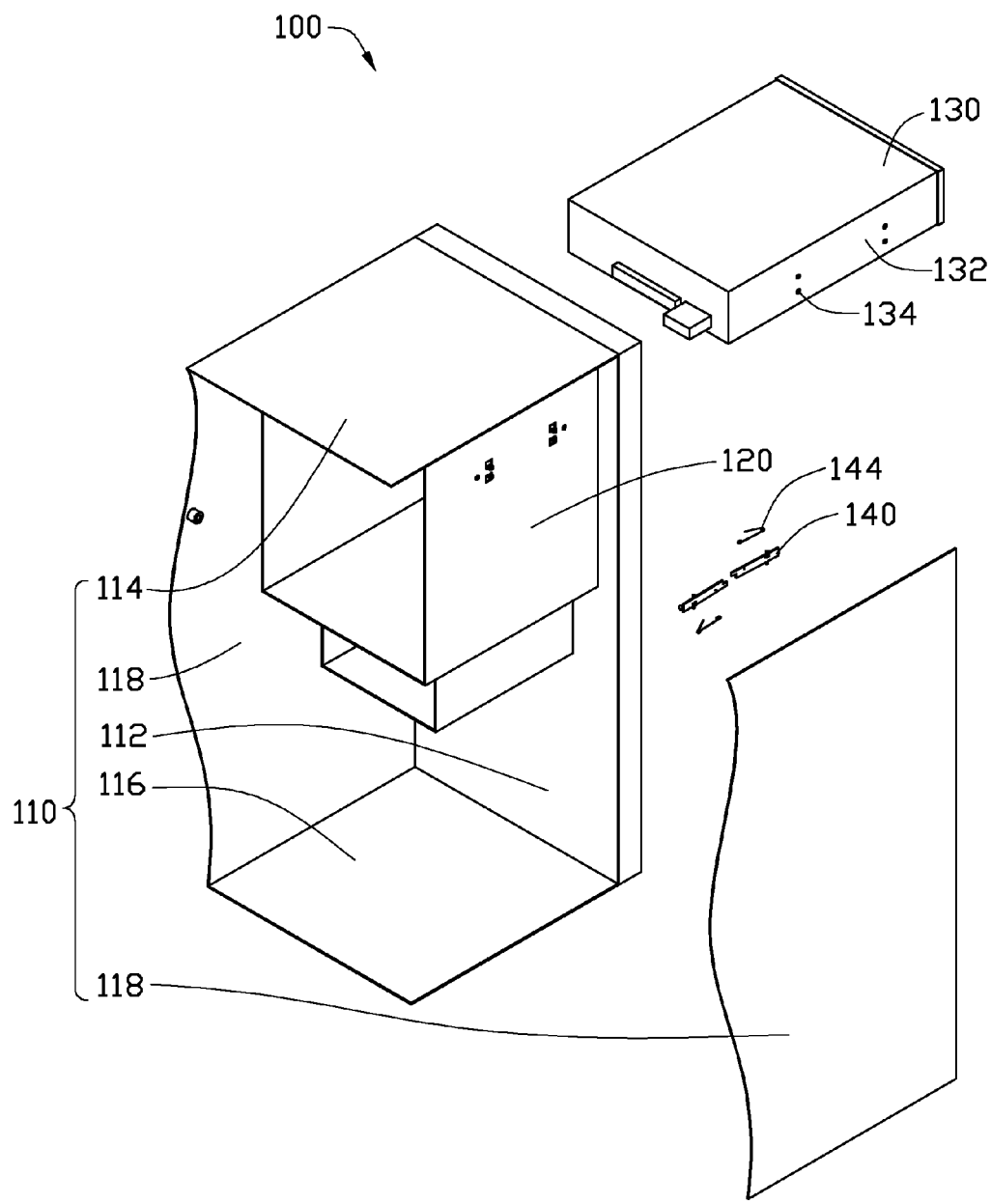
FIG. 1 is an isometric exploded view of a hardware holding device in a computer, in accordance with an exemplary embodiment.
Figure 2:
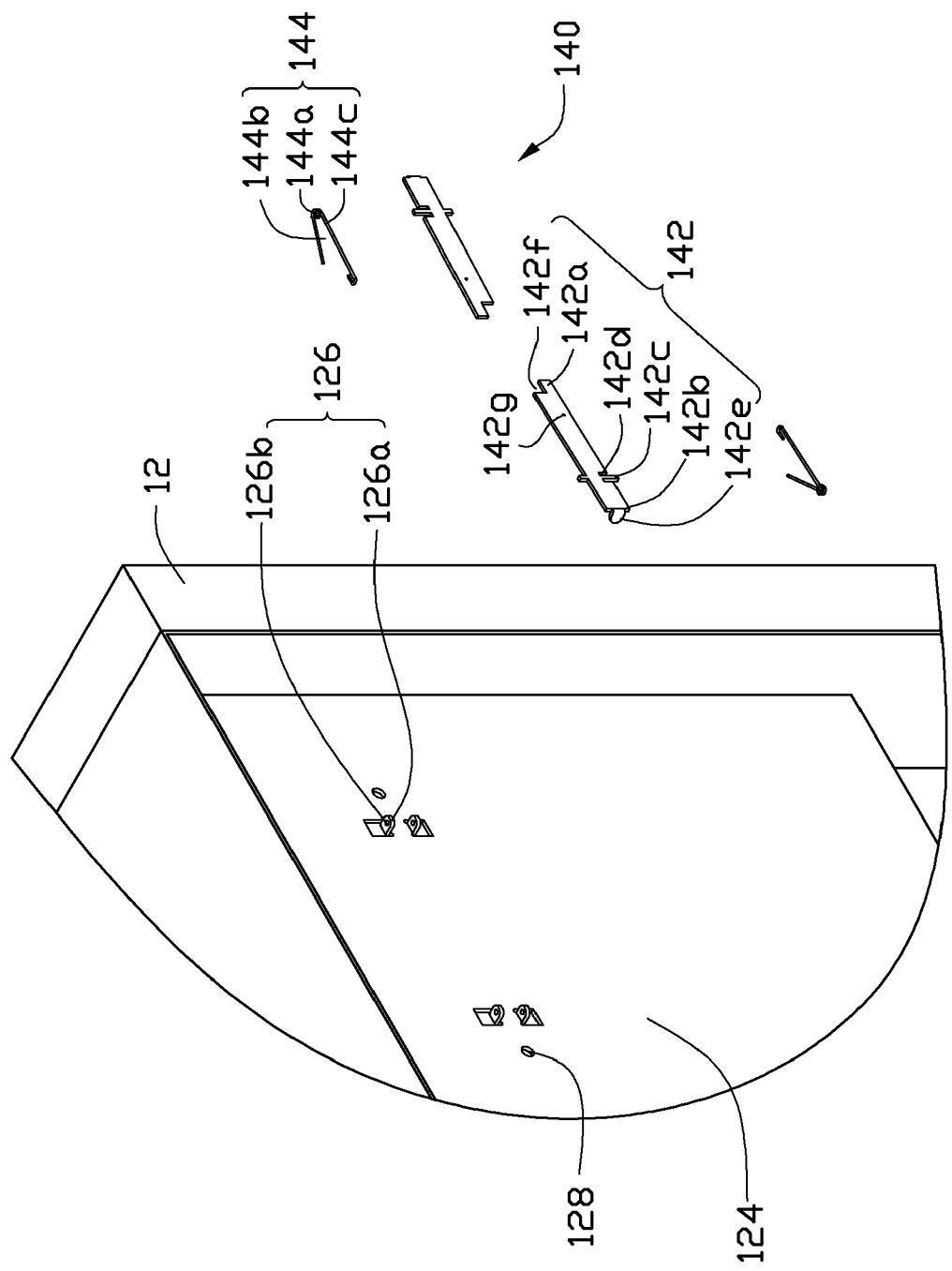
FIG. 2 is a partial, enlarged view of a fastening structure of the hardware holding device of FIG. 1.
Figure 6:
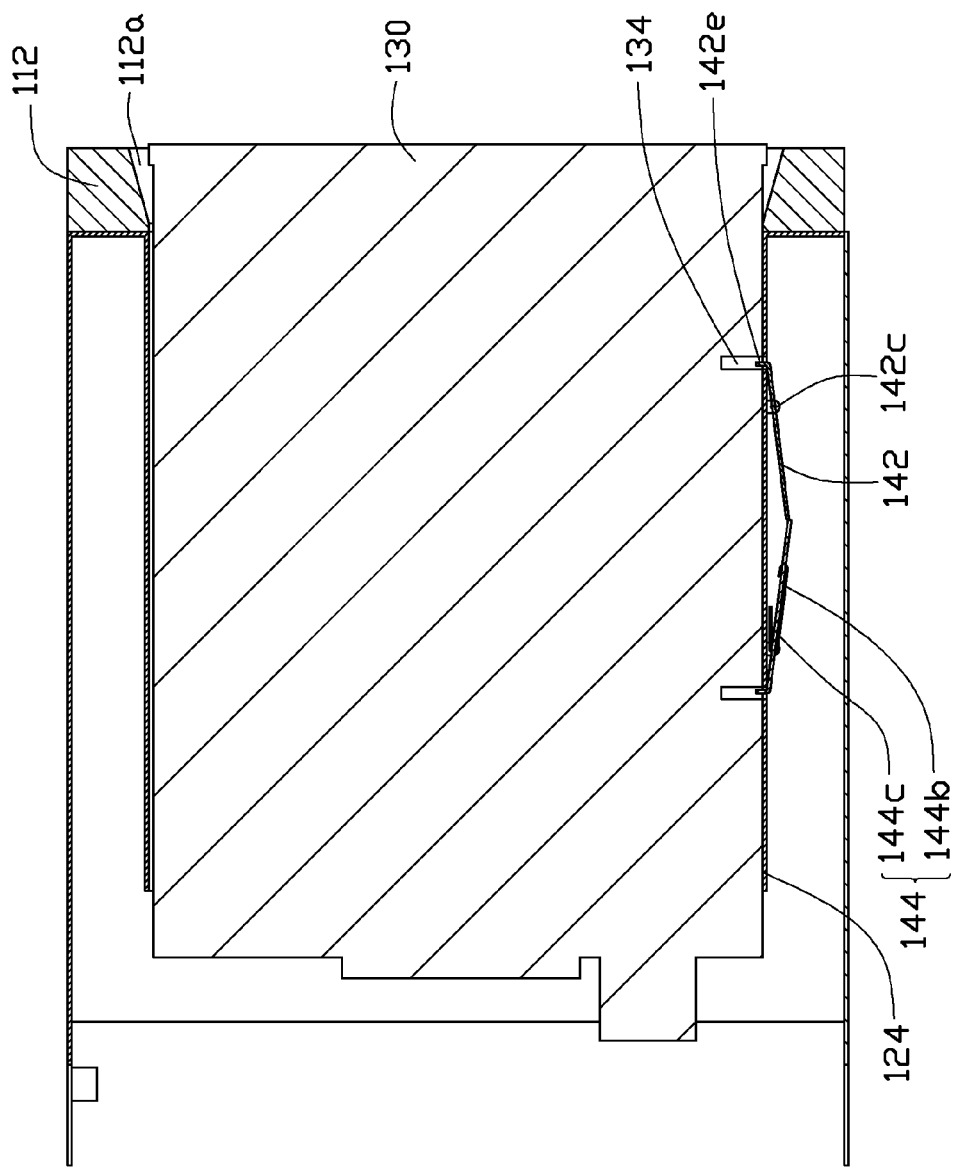
FIG. 6 is a cross section view of the fastening structure of FIG. 5, taken along line VI-VI.

Referring to FIGS. 1, 2 and 6, the hardware holding device 100 includes a chassis 110, a bracket 120, a hard disk 130, and a fastening structure 140. The bracket 120 is fixed in the chassis 110. The hardware component 130 is fixed on the bracket 120 by the fastening structure 140 and can be manually detached from the bracket 120 just by a slight press on the fastening structure 140, without any assistance of tools.

The chassis 110 includes a front plate 112, a top plate 114 perpendicularly connected to the top side of the front plate 112, a bottom plate 116 opposite and parallel to the top plate 114 and connected to the bottom side of the front plate 112, and two side plates 118 perpendicularly connected to the top plate 114 and the bottom plate 116 thereby cooperatively forming the chassis 110 with the front plate 112. An opening 112a is defined in the front plate 112 for exposing some hardware of a computer such as a CD-ROM, or port interfaces.

The bracket 120 is a rectangular frame mounted on the top plate 114 of the chassis 110. The bracket 120 includes two first walls 122 and two second walls 124 perpendicularly interconnecting the first walls 122. The first and second walls 122 and 124 all are perpendicular to the front plate 112 of the chassis 110 and cooperatively form a compartment (not labeled) communicating with the opening 112a in the front plate 112. The bracket 120 includes two shaft seats 126 formed on one of the second walls 124 and approximately aligned with the opening 112a. Each of the shaft seats 126 includes two projecting lugs 126a perpendicularly extending from the second wall 124, and each defines a shaft hole 126b for holding a shaft therein. The projecting lugs 126a of each shaft seat 126 are parallel and spaced apart. Two through holes 128 are defined beside the shaft seats 126 and spaced from each other by the shaft seats 126. The through holes 128 are approximately located on a straight line passing through middle of both the shaft seats 126 for allowing latches of the fastening structure 140 passing therethrough.

The hardware component 130 includes two opposite side surfaces 132 and two pin holes 134 defined in one of the side surfaces 132 corresponding to the though holes 128 of the bracket 120. The pin holes 134 are used for receiving the latches of the fastening structure 140 thereby fixing the hardware component 130 in the bracket 120.

The fastening structure 140 includes two levers 142 and two elastic members 144. Each of the levers 142 is a stave having a pressing end 142a and an opposite fastening end 142b. Two pivots 142c perpendicularly protrude from two opposite lateral sides of each lever 142, close to the corresponding fastening end 142b, two slots 142d are defined at the foot of one of the pivots 142c and spaced from each other by the pivot 142c. The slots 142d are provided for accommodating portions of the elastic member 144. A latch 142e perpendicularly extends from the fastening end 142b of each lever 142 for extending through the corresponding one of the through holes 128 and inserting into one of the pin holes 134 thereby fixing the hard disk 130. A notch 142f is defined in the pressing end 142a of each lever 142 for engaging with a protrusion beside the notch 142f of another lever 142 to avoid interference between the levers. Each of the elastic members 144 includes a resilient coil portion 144a, a resilient first arm 144b extending from an end of the coil portion 144a, and a resilient second arm 144c extending from another end of the coil portion 144a along a direction angled from the extending direction of the resilient first arm 144b.

Figure 3:
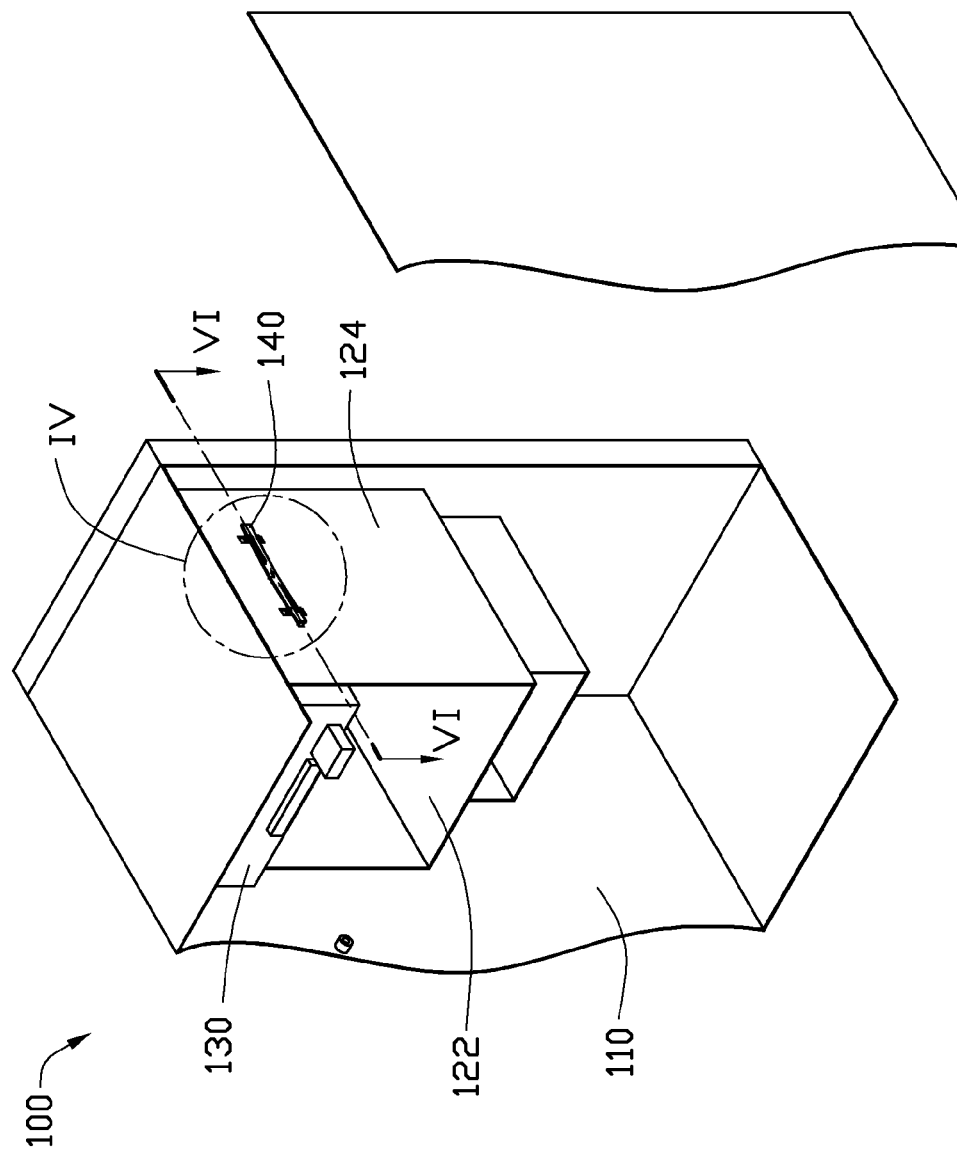
FIG. 3 is an isometric, assembled view of the hardware holding device of FIG. 1.
Figure 4:
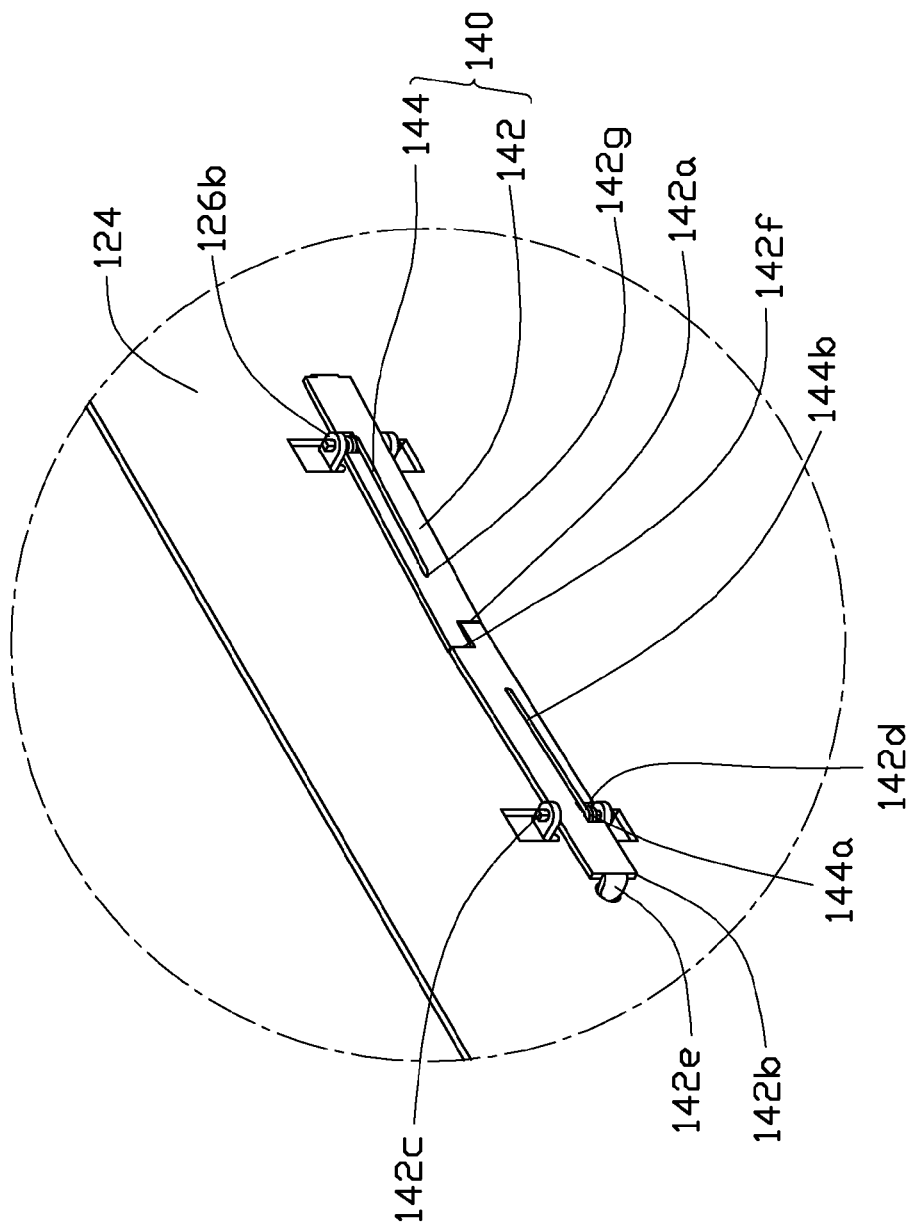
FIG. 4 is an enlarged assembled view of the fastening structure of FIG. 3, showing the encircled portion IV.

Referring FIGS. 3 and 4, in assembly, each of the elastic members 144 is mounted on one of the levers 142 by the coil portion 144a which is sleeved on the corresponding pivot 142c and received in the slots 142d. The first arms 144b and the second arms 144c are positioned at opposite sides of the corresponding lever 142. Each of the levers 142 is rotatably mounted on a corresponding one of the shaft seats 126 by inserting the pivots 142c in the shaft holes 126b. The first arms 144b resiliently resist against the sidewall 124 thereby pushing the pressing ends of the levers 142 away from the sidewall 124 of the bracket. The latches 142e respecively align with and pass through the through holes 128. Alternatively, a fixing hole 142g is defined in each of the levers 142, close to the pressing end 142a for the end of the second arm 144c of the corresponding elastic member to be fixed therein.

Figure 5:
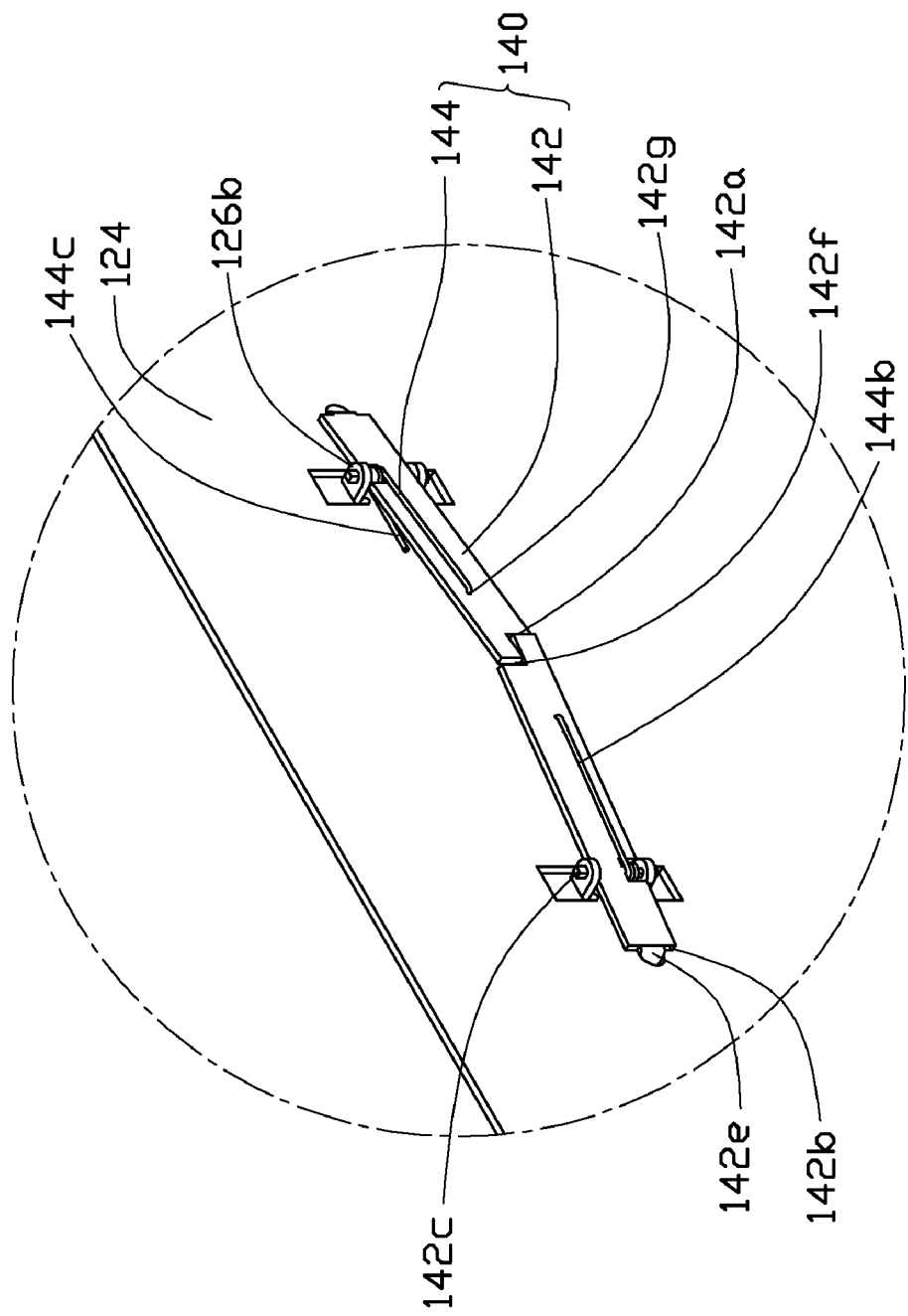
FIG. 5 is similar to FIG. 4, but showing the fastening structure in a using status.

Referring FIGS. 5 and 6, in use, the pressing ends 142a of the levers 142 are pressed towards the sidewall 124 of the bracket 120, thereby drawing the latches 142e out from the through holes 128. Afterwards, the hard disk 130 is pushed into the compartment of the bracket 120 through the opening 112a of the front plate 112. The pin holes 134 on the hardware component 130 are arranged to align with the through holes 128. The levers 142 are released and the elastic members 144 force the latches 142e to pass through the through holes 128 and insert into the pin holes 134, thereby fixing the hardware component 130 in the bracket 120. When detaching the hard disk 130 from the bracket 120, users can easily take out the hardware component 130 by pressing the lever 142 to release the hardware component 130 from the fixed state.

In the present disclosure, the hardware component 130 can be easily detached from the chassis 100 without the use of tools, which is very convenient for users.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A hardware holding device comprising:

a chassis, the chassis comprises a front plate, a top plate perpendicularly connected to a top side of the front plate, a bottom plate opposite and parallel to the top plate and connected to a bottom side of the front plate, and two side plates respectively and perpendicularly connected to the top plate and the bottom plate and cooperatively form the chassis with the front plate; and opening is defined in the front plate for installing a hardware component;

a bracket fixed in the chassis, the bracket is mounted on the top plate and the bracket comprises two first walls and two second walls perpendicularly interconnected the two first walls; the two first walls and the two second walls are perpendicular to the front plate of the chassis and cooperatively form a compartment communicating with the opening for accommodating the hardware component; the fastening structure is mounted on one of the two second walls of the bracket;

a fastening structure comprising two levers each having a latch perpendicularly extending from one end of a corresponding lever of the two levers, and a respective elastic member of two elastic members arranged on each of the two levers; the each of the two levers being rotatably mounted on the bracket; the two elastic members being resiliently compressed between the bracket and the two levers to keep the latches of the two levers passing through the bracket and entering into an inside of the bracket thereby clasping and fixing the hardware component in the bracket;

wherein the bracket comprises two shaft seats formed on the one of the second walls and approximately aligning to the opening of the front plate for rotatably holding the two levers of the fastening structure; each of the two shaft seats comprises two projecting lugs perpendicularly extending from the one of the two second walls; each projecting lug of the two projecting lugs defines a shaft hole; the each of the two levers comprises a pressing end and an opposite fastening end; the each of the two levers of the fastening member comprises two pivots perpendicularly protruding from two opposite lateral sides of the each of the two levers near to the fastening end of the lever; each of the two pivots are respectively received in the shaft hole of the each of the two shaft seats; two slots are defined on a lateral side of the each of the two levers around a corresponding pivot of the two pivots and cooperatively form a recess where portions of each of the two elastic members is received; and the each of the two levers defines a notch in the pressing end for providing an engagement with a corresponding protrusion formed beside the notch of the other lever of the two levers to keep the stability of the two levers.

2. The hardware holding device of claim 1, wherein a respective one of two through holes are defined beside the each of the two shaft seats and spaced from each other by the two shaft seats, the two through holes are configured for the latches of the two levers to extend through and enter into the inside of bracket.

3. The hardware holding device of claim 2, wherein the two through holes approximately locates on a straight line passing through middle of both of the two shaft seats.

4. The hardware holding device of claim 2, wherein each of the two levers is a stave.

5. The hardware holding device of claim 4, wherein each of the two elastic members comprises a resilient coil portion, a resilient first arm extending from an end of the coil portion, and a resilient second arm extending from another end of the coil portion along a direction angled from an extending direction of the resilient first arm; the coil portion of each of the two elastic members is received in each of the two slots and sleeved on the corresponding pivot; the resilient first arm and the resilient second arm are distributed at opposite sides of the corresponding lever with the resilient second arm fixed on the corresponding lever; the resilient first arm of the each of the two elastic members resiliently resists on the side wall of the bracket.

6. The hardware holding device of claim 5, wherein a fixing hole is defined on the each of the two levers adjacent to the pressing end for fixing the end of the resilient second arm of the corresponding elastic member of the two elastic members.

7. The hardware holding device of claim 2, wherein the hardware component comprises two opposite side surfaces and two pin holes defined on one of the two opposite side surfaces corresponding to the two though holes of the bracket; the latches are enter into the two pin holes of the hardware component thereby fixing the hardware component in the bracket.

* * * * *